(12) United States Patent
Wieland

(10) Patent No.: US 12,235,146 B2
(45) Date of Patent: Feb. 25, 2025

(54) METHOD AND DEVICE FOR ASCERTAINING THE FLUID INJECTION QUANTITY OF AN INJECTION SYSTEM

(71) Applicant: Vitesco Technologies GmbH, Regensburg (DE)

(72) Inventor: Anselm Wieland, Cologne (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/171,420

(22) Filed: Feb. 20, 2023

(65) Prior Publication Data

US 2023/0204400 A1   Jun. 29, 2023

Related U.S. Application Data

(63) Continuation of application No. PCT/EP2021/073087, filed on Aug. 19, 2021.

(30) Foreign Application Priority Data

Aug. 31, 2020   (DE) .................. 10 2020 210 984.2

(51) Int. Cl.
*G01F 22/02*     (2006.01)
*F02D 41/38*     (2006.01)
*G05B 19/416*    (2006.01)

(52) U.S. Cl.
CPC ......... *G01F 22/02* (2013.01); *F02D 41/3809* (2013.01); *G05B 19/416* (2013.01); *G05B 2219/37371* (2013.01)

(58) Field of Classification Search
CPC .............. G01F 22/02; F02D 41/3809; F02D 2041/286; F02D 2200/0602;
(Continued)

(56) References Cited

U.S. PATENT DOCUMENTS 6,182,013 B1 *   1/2001   Malinverno ........... E21B 47/047
                                                       702/7
2006/0104313 A1 *  5/2006   Haner .................... H04L 47/193
                                                       370/328
(Continued)

FOREIGN PATENT DOCUMENTS

CN      104732291 A  *  6/2015
CN      105177199 A  *  12/2015
(Continued)

OTHER PUBLICATIONS

International Search Report and Written Opinion dated Dec. 9, 2021 from corresponding International Patent Application No. PCT/EP2021/073087.
(Continued)

*Primary Examiner* — Joseph J Dallo

(57) ABSTRACT

A method and a device for ascertaining a fluid injection quantity of an injection system. The injection system includes a high-pressure pump, a high-pressure region that adjoins the high-pressure pump, a pressure sensor, and an injector that is fed from the high-pressure region. The method includes detecting a measurement signal using the pressure sensor and segmenting a first pressure profile from the measurement signal. The first pressure profile characterizes the pressure profile prior to a fluid injection using the injector. The method also includes segmenting a second pressure profile from the measurement signal. The second pressure profile characterizes the pressure profile after the fluid injection using the injector. The method also includes performing a kernel density estimation using the first pressure profile and the second pressure profile, ascertaining a pressure difference, and ascertaining the fluid injection quantity using the pressure difference.

16 Claims, 3 Drawing Sheets

(58) Field of Classification Search
CPC ......... F02D 41/0085; F02D 2200/0616; G05B 19/416; G05B 2219/37371
See application file for complete search history.

(56) References Cited

U.S. PATENT DOCUMENTS

| | | | | |
|---|---|---|---|---|
| 2007/0299561 | A1* | 12/2007 | Montaser | B05B 12/082 |
| | | | | 250/252.1 |
| 2009/0210133 | A1 | 8/2009 | Kemmer | |
| 2009/0314490 | A1* | 12/2009 | Prange | G06Q 10/04 |
| | | | | 166/250.09 |
| 2010/0168989 | A1* | 7/2010 | Gao | F02D 41/2477 |
| | | | | 701/111 |
| 2014/0052407 | A1* | 2/2014 | Ladd | G01B 13/20 |
| | | | | 702/167 |
| 2019/0255787 | A1* | 8/2019 | Ghanem | B29C 70/548 |
| 2019/0277242 | A1 | 9/2019 | Sata | |
| 2020/0102929 | A1* | 4/2020 | Sata | F02D 19/0649 |
| 2020/0116099 | A1 | 4/2020 | Pursifull | |

FOREIGN PATENT DOCUMENTS

| | | | | | |
|---|---|---|---|---|---|
| CN | 106202918 | A | * | 12/2016 | ............. G16Z 99/00 |
| CN | 106202918 | B | * | 10/2018 | ............. G16Z 99/00 |
| DE | 102009003279 | A1 | | 11/2010 | |
| DE | 102012219353 | B3 | | 2/2014 | |
| DE | 102006023693 | B4 | | 6/2017 | |
| DE | 102019127390 | A1 | | 10/2019 | |
| EP | 2518297 | B1 | | 2/2016 | |
| WO | WO-2004099917 | A2 | * | 11/2004 | ............. G06Q 10/06 |
| WO | WO-2005098230 | A1 | * | 10/2005 | ............. F02B 17/00 |
| WO | WO-2006104434 | A1 | * | 10/2006 | ............. F02D 35/02 |
| WO | 2008028849 | A1 | | 3/2008 | |
| WO | WO-2008122213 | A1 | * | 10/2008 | ......... F02D 41/2422 |
| WO | WO-2010129247 | A2 | * | 11/2010 | ............. G01V 11/00 |
| WO | WO-2015021441 | A1 | * | 2/2015 | ......... A61B 5/14532 |
| WO | WO-2020195223 | A1 | * | 10/2020 | |

OTHER PUBLICATIONS

German Office Action dated Mar. 15, 2021 for corresponding German Patent Application No. 10 2020 210 984.2.

* cited by examiner

METHOD AND DEVICE FOR ASCERTAINING THE FLUID INJECTION QUANTITY OF AN INJECTION SYSTEM

CROSS-REFERENCE TO RELATED APPLICATIONS

This application claims the benefit of International Application PCT/EP2021/073087, filed Aug. 19, 2021, which claims priority to German Application 10 2020 210 984.2, filed Aug. 31, 2020. The disclosures of the above applications are incorporated herein by reference.

TECHNICAL FIELD

The disclosure relates to a method and a device for ascertaining a fluid injection quantity of an injection system. The injection system includes a high-pressure pump, a high-pressure region that adjoins the high-pressure pump, a pressure sensor, and an injector that is fed from the high-pressure region.

BACKGROUND

Injection systems are used to inject fuel, for example directly, into combustion chambers of an internal combustion engine. Against the background of increasingly stringent consumption and emissions standards, new challenges/requirements are emerging with regard to the accuracy with which fuel is metered in these injection systems. Untreated engine emissions, and pollutant conversion by an exhaust-gas aftertreatment system of the internal combustion engine, are dependent on the fuel/air ratio in the cylinder of the internal combustion engine. Conventional lambda control with a broadband lambda probe between the internal combustion engine and a 3-way catalytic converter in the exhaust-gas section however takes into consideration only the ratio of air to injected fuel mass that is set globally in the internal combustion engine. It is accordingly firstly necessary to ensure a uniform distribution of the air masses across the individual cylinders of the internal combustion engine, and secondly also to ensure accurate metering of the fuel mass into each cylinder by way of the injection system.

For advantageous combustion, and in order to comply with the consumption and emissions standards, it is accordingly necessary to determine the fluid injection quantity per cylinder per working cycle. In conventional injection systems, this is done by determining opening and closing times of the individual valves/injectors on the basis of actuation voltage and actuation current, whereupon any differences in the hydraulic opening duration are compensated by adapting the injector-specific electrical actuation duration. These conventional injection systems however do not take into consideration any deviations in an injector-specific throughflow behavior that may arise for example due to manufacturing tolerances or nozzle/injector coking over the service life of the injector.

SUMMARY

The disclosure provides a method and a device with which a fluid injection quantity of an injection system can be reliably and exactly ascertained.

One aspect of the disclosure provides a method for ascertaining a fluid injection quantity of an injection system. The injection system includes a high-pressure pump, a high-pressure region that adjoins the high-pressure pump, a pressure sensor, and an injector that is fed from the high-pressure region. The method includes detecting a measurement signal using the pressure sensor during the operation of the injection system. The measurement signal characterizing the fluid pressure in the high-pressure region. The method includes segmenting a first pressure profile from the measurement signal. The first pressure profile characterizes the pressure profile prior to a fluid injection using the injector. The method also includes segmenting a second pressure profile from the measurement signal. The second pressure profile characterizes the pressure profile after the fluid injection using the injector. Additionally, the method includes performing a kernel density estimation using the first pressure profile and the second pressure profile in order to determine a first probability density function prior to the fluid injection and a second probability density function after the fluid injection. The method also includes ascertaining a pressure difference from the first probability density function and the second probability density function and ascertaining the fluid injection quantity using the pressure difference.

Implementations of the disclosure may include one or more of the following optional features. In some implementations, the high-pressure pump of the injection system is configured to bring fluid/fuel to a predefined pressure and to deliver the fluid/fuel into the high-pressure region and to maintain/control the predetermined pressure in the high-pressure region by pumped replenishment of fluid/fuel. The injector or the injectors of the injection system are configured to inject fluid/fuel from the high-pressure region into the cylinders of the internal combustion engine. Such an injection results in a reduction of the pressure in the high-pressure region. The pressure sensor of the injection system according to the present disclosure is configured to detect the pressure profile of the pressure in the high-pressure region. Accordingly, a pressure increase resulting from a delivery action of the high-pressure pump, or a pressure reduction resulting from an injection by the injector, is detected and is evident in the measurement signal of the pressure sensor.

In some implementations, the measurement signal of the pressure sensor is detected during the operation of the injection system. The measurement signal characterizes the fluid pressure in the high-pressure region. Accordingly, the injections of fluid/fuel by the injectors, and additionally the feed of fluid/fuel by the high-pressure pump into the high-pressure region, are visible in the measurement signal.

In some examples, in a further step, the first pressure profile is segmented from the measurement signal. The first pressure profile characterizes the pressure profile prior to a fluid injection using the injector. Accordingly, no injection of fuel from the high-pressure region occurs during the first pressure profile, such that the pressure in the high-pressure region remains constant. Furthermore, in one example, it is also the case that no pressure increase resulting from introduction of fuel into the high-pressure region using the high-pressure pump occurs. In some examples, the second pressure profile is furthermore segmented from the measurement signal. The second pressure profile characterizes the pressure profile after the fluid injection using the injector. Accordingly, the injection of fluid has taken place, and the pressure in the high-pressure region has decreased due to the injection of fluid.

In some implementations, in a further step, the kernel density estimation is performed using the first pressure profile and the second pressure profile, and from this the first probability density function and the second probability density function are determined. The first probability density function is that function prior to the fluid injection using the injector, and the second probability density function is that density function after the fluid injection using the injector. During this step, the first pressure profile and the second pressure profile are processed specifically using the kernel density estimation, such that the pressure set during this period of time can be better read from the measured pressure profiles. The kernel density estimation yields a distribution function with a maximum. By contrast to simple mean value calculation, the method is robust with respect to an inclusion of additional pressure values which possibly also include outliers or which do not lie at the average value. Such additional pressure values could arise, for example, during delivery of fuel by the high-pressure pump or during an additional injection.

In some implementations, in a further method step, the pressure difference is ascertained from the first probability density function and the second probability density function. As already mentioned, the first probability density function and the second probability density function yield a distribution function with a respective maximum. In some examples, by calculating the difference between the maxima, the respective pressure difference during or between the period of time prior to the injection using the injector and the period of time after the injection using the injector can be ascertained.

In some implementations, in a further step, the fluid injection quantity is ascertained using the ascertained pressure difference. The fluid injection quantity during a fluid injection by the injector can be ascertained using the known volume of the high-pressure region, the speed of sound and specifically the ascertained pressure difference. Due to the kernel density estimations being performed using the first pressure profile and the second pressure profile, the pressure difference may be advantageously accurately ascertained. Since the pressure difference can be advantageously accurately ascertained, the fluid injection quantity can also subsequently be advantageously accurately determined using the ascertained pressure difference. The high-pressure volume of the injection system is specified by the geometry thereof, and is determinable or known. Overall, according to the disclosure, the fluid injection quantity can be advantageously accurately determined, whereby the internal combustion engine can be advantageously operated and the prescribed emissions can be complied with.

The analytical mathematical relationship between injected fluid quantity and pressure drop is determined based on the following equation, where V is the volume of the high-pressure region, $\Delta p$ is the pressure difference, c is the speed of sound and $m_f$ is the injected fluid quantity:

$$\frac{V}{c^2}\Delta p = m_f.$$

The pressure difference can be advantageously accurately ascertained using the kernel density estimation, such that, given a constant volume of the high-pressure region and a constant speed of sound, the injected fluid quantity can be advantageously accurately ascertained.

In some examples, a maximum of the first probability density function and a maximum of the second probability density function is determined, and the pressure difference is ascertained using the two maxima. The probability density functions are functions similar to a Gaussian curve/normal distribution with a peak/maximum. This maximum indicates the average pressure during the period of time prior to the fluid injection/or during the period of time after the fluid injection. Accordingly, the pressure difference between the periods of time prior to the fluid injection and after the fluid injection using the injector can be very accurately ascertained using the two maxima, by calculating the difference. In this case, the pressure difference can be advantageously accurately ascertained, whereby, in turn, the fluid injection quantity can be advantageously accurately ascertained, and the internal combustion engine can be advantageously operated.

In some implementations, a system constant is provided, and the system constant is taken into consideration when ascertaining the fluid injection quantity. In this example, the system constant takes into consideration geometry-dependent variables of the injection system. In some examples, the geometry-dependent variables of the injection system are, for example, the volume of the high-pressure region, that is to say of the volume in which the fuel/the fluid are held under high pressure. In some examples, the system component may additionally have a proportionality constant that takes into consideration the relationship between natural frequency and speed of sound in the high-pressure region.

The analytical mathematical relationship between injected fluid quantity and pressure drop is determined based on the following equation, where $m_f$ is the injected fluid quantity, $k_{sys}$ is the system constant, $\Delta p$ is the pressure difference, and f is the natural frequency:

$$m_f = k_{sys}\frac{\Delta p}{f^2}.$$

In this example, all system constants, such as the volume of the high-pressure region and the proportionality constant for the relationship between natural frequency and speed of sound are combined in the system component $k_{sys}$.

In some implementations, a variable speed of sound is ascertained from the geometry of the high-pressure region and the natural frequency of a standing wave stimulated by a pump delivery action of the high-pressure pump and fluid injection by the injector. The variable speed of sound ascertained therefrom is taken into consideration when ascertaining the fluid injection quantity. The speed of sound is an important variable for accurately ascertaining the fluid injection quantity. The speed of sound is dependent on the pressure and the temperature of the fluid in the high-pressure region. A pump delivery action of the high-pressure pump, that is to say an increase in the pressure in the high-pressure region, and fluid injection by the injector, cause a standing wave to be stimulated in the high-pressure region. This standing wave has a natural frequency which can be ascertained and which can in turn be used in ascertaining the variable speed of sound. The duration required for the wave to pass through the high-pressure region, or the relationship between the hydraulic natural frequencies and the speed of sound, are dependent on the geometry of the high-pressure region. In some examples, the stimulated standing wave can be ascertained from the measurement signal of the pressure sensor. Accordingly, the natural frequency can be determined from the measurement signal of the pressure sensor, from which natural frequency, in turn, it is possible to ascertain the variable speed of sound that is used for ascertaining the fluid injection quantity of a fluid injection by the injector. The fluid injection can thus additionally be advantageously accurately performed.

In some implementations, the natural frequency is ascertained from a part of the measurement signal of the pressure sensor using a fast Fourier transformation. The determined natural frequency increases proportionally with respect to the speed of sound in the event of a pressure increase in the high-pressure region and a temperature decrease. The natural frequency is accordingly dependent on the pressure of the high-pressure region and the temperature of the high-pressure region. In some examples, the temperature can be ascertained using a temperature sensor, and the pressure can be ascertained using the pressure sensor, from the measurement signal of the pressure sensor. In some implementations, the temperature can be ascertained using a characteristic map which on a test stand using a test fuel (for example n-heptane). In some examples, however, because the pressure oscillations are evaluated using the fast Fourier transformation, it is no longer necessary to determine the temperature. Overall, the fast Fourier transformation yields informative values for the natural frequency, whereby the fluid injection quantity can in turn be advantageously accurately determined.

In some implementations, a triangular kernel and/or a predetermined bandwidth is used in the kernel density estimation, the bandwidth may be 0.5 bar to 1 bar. Calculation can be performed advantageously quickly with the triangular kernel, whereby the method can be carried out in real time and on embedded hardware (for example an engine control unit). Greater smoothing of the resulting probability density function is achieved with increasing bandwidth. In some examples, a normal distribution is used as a kernel in the kernel density estimation.

In some implementations, the injection system has several of the injectors, which are each fed from the high-pressure region, injector-specific pressure profiles being segmented from the measurement signal for each of the injectors, and the first probability density functions and the second probability density functions each being determined, and the respective pressure difference being ascertained for each of the injectors, and the respective fluid injection quantity being ascertained, using the respective pressure difference, for each of the injectors. In this example, the injection system has several injectors, which each inject fluid from the high-pressure region into a cylinder, for example. In some examples, this injection is performed in a time-offset manner, such that the required injector-specific pressure profiles can be segmented from the measurement signal of the pressure sensor and assigned. The respective first probability density functions and second probability density functions assigned to the injectors can subsequently be determined from these injector-specific pressure profiles using a respective kernel density estimation. The respective pressure differences can in turn be subsequently ascertained for each of the injectors from these probability density functions. From these injector-specific pressure differences, the injector-specific fluid injection quantity can in turn be ascertained for each injector of the injection system on the basis of the respective pressure difference. In this way, for an injection system with several injectors, the exact fluid injection quantity can be determined for each individual injector. In some implementations, this exact fluid injection quantity can be compared with a predefined required fluid injection quantity for the optimum operation of the internal combustion engine and can be increased or reduced by actuation of the injectors in order to implement the predefined fluid injection quantity. In this way, the fluid injection quantity for each injector can be advantageously accurately determined, whereby the operation of the internal combustion engine can in turn be advantageously performed.

In some implementations, the ascertained fluid injection quantity is compared with a predetermined injection quantity, and an actuation of the injector is adapted if the ascertained fluid injection quantity deviates from the predetermined injection quantity.

In some implementations, a device for ascertaining a fluid injection quantity of an injection system, the injection system having a high-pressure pump, a high-pressure region that adjoins the high-pressure pump, a pressure sensor, and an injector that is fed from the high-pressure region, has a control unit that is configured to control the method as described above. The device may be an engine control unit. It is also conceivable that the device is part of the engine control unit or is installed as an additional control unit, for example in a vehicle with the injection system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
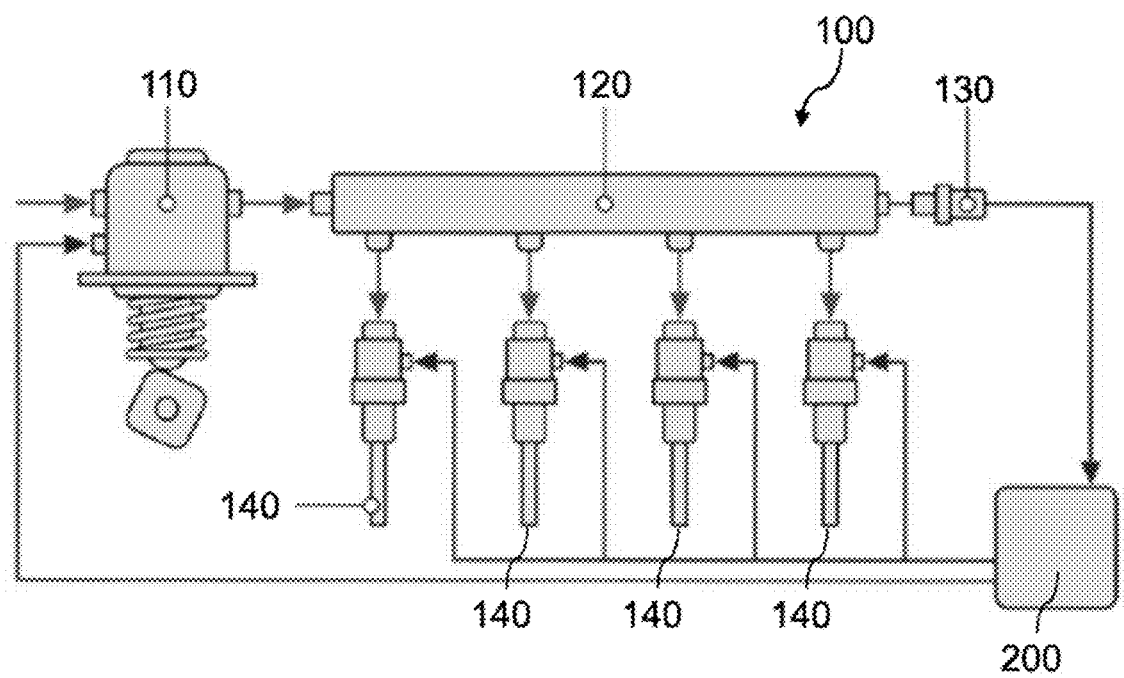
FIG. 1 is a schematic illustration of an exemplary injection system with a control unit.

FIG. 1 shows a schematic illustration of an injection system 100, for example for an internal combustion engine. The injection system 100 has a high-pressure pump 110, a high-pressure region 120, a pressure sensor 130, and multiple injectors 140. FIG. 1 additionally shows a control unit 200 that is configured to control the injection system 100. During the operation of the injection system 100, fluid is delivered from a fluid accumulator (not shown) into the high-pressure region 120 by way of the high-pressure pump 110, whereby the pressure of the fluid is additionally increased by way of the high-pressure pump 110 to the desired pressure. The high-pressure region 120 has a rail which is connected to the injectors 140 and from which the injectors 140 are fed with fluid. The control unit 200 actuates the injectors 140, whereby the fluid is injected from the high-pressure region 120 into combustion chambers, for example of the internal combustion engine, for combustion. The pressure sensor 130 detects a measurement signal 310 (shown in FIG. 2) that characterizes the pressure profile of the pressure within the high-pressure region 120. The pressure sensor 130 transmits the measurement signal 310 to the control unit 200, which in turn processes the measurement signal 310 and controls the injection system 100 based on the results.

Figure 2:
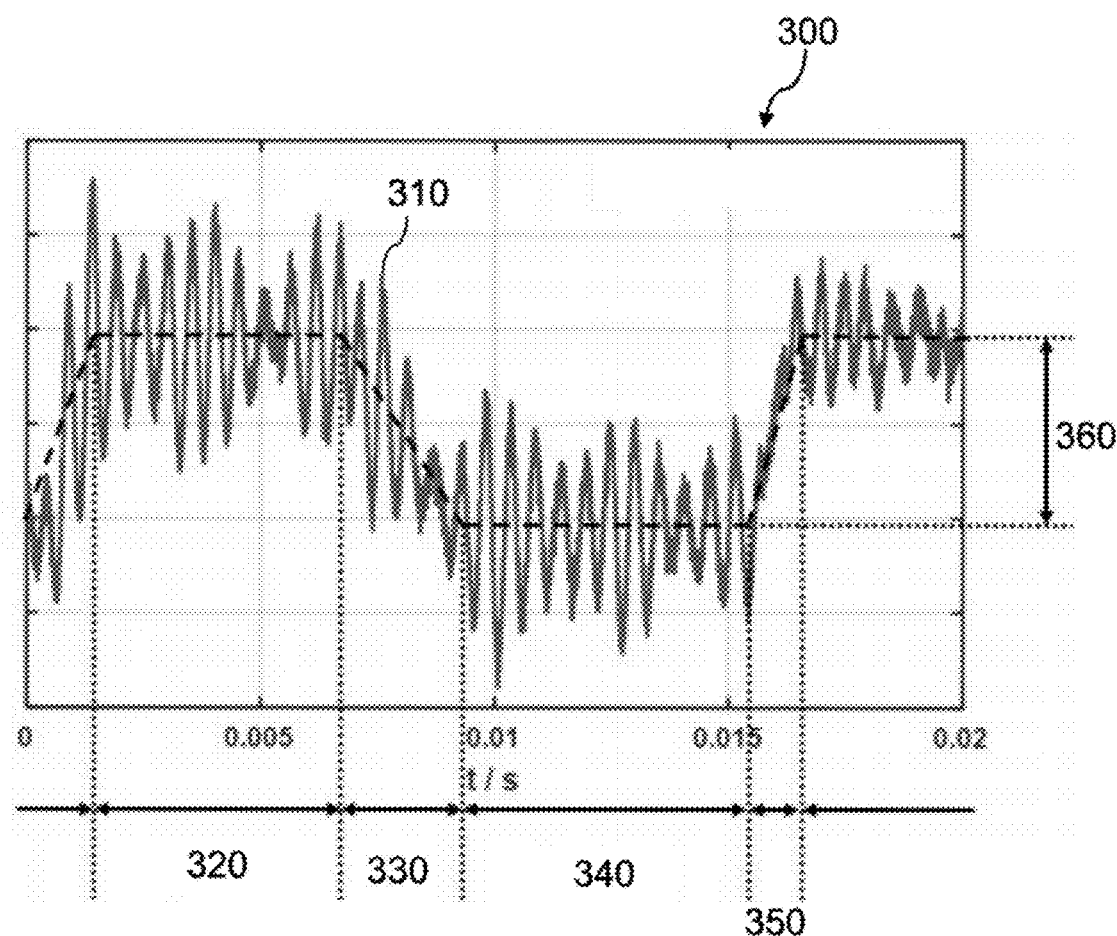
FIG. 2 shows a first pressure profile diagram according to a first example.

FIG. 2 shows a first pressure profile diagram 300. In the first pressure profile diagram 300, the measurement signal 310 of the pressure sensor 130 is plotted versus the time. The measurement signal 310 is segmented into a first pressure region 320, an injection region 330, a second pressure profile 340, and a pump region 350. The first pressure profile 320 represents the profile of the pressure signal prior to the injection using the injector 140. The injection region 330 represents the profile of the measurement signal 310 during the injection using the injector 140. It can be seen here that the pressure within the high-pressure region 120 decreases due to the injection using the injector 140. The second pressure profile 340 represents the profile of the measurement signal 310 after the injection using the injector 140 and before the pumping phase in which fluid is introduced into the high-pressure region 120 using the high-pressure pump 110. The pump region 350 of the measurement signal 310 represents the profile of the measurement signal 310 during the pumping phase. It can be seen here that the pressure within the high-pressure region 120 increases due to the introduction of fluid into the high-pressure region 120 using the high-pressure pump 110. FIG. 2 additionally illustrates the pressure difference 360 between the first pressure profile 320 and the second pressure profile 340. The times required for the segmentation are known, because the control unit 200 itself performs the actuation of the injectors 140. In this way, the measurement signal 310 of the pressure sensor 130 can be advantageously easily and accurately segmented. The method is additionally robust with respect to slight time shifts.

Figure 3:
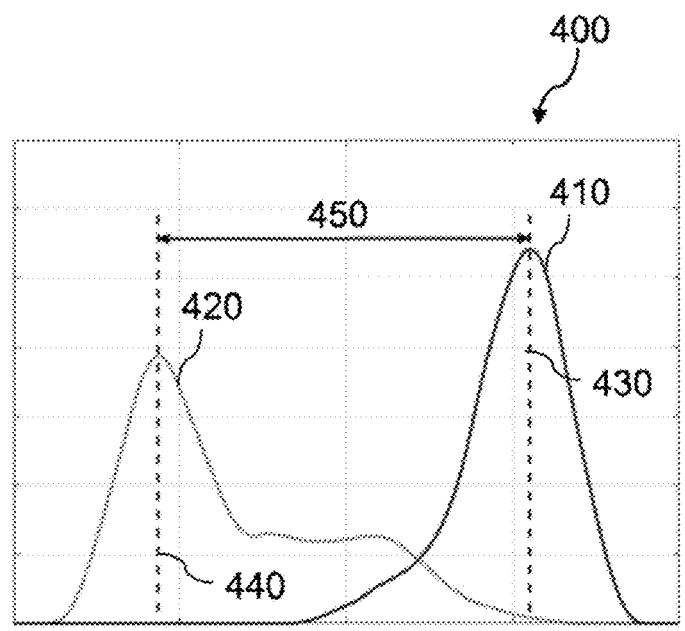
FIG. 3 shows a first kernel density estimation diagram according to the first example.

FIG. 3 shows a first kernel density estimation diagram 400, with a first probability density function 410 and a second probability density function 420 being illustrated in the first kernel density estimation diagram 400. With the kernel density estimation, it is sought to ascertain the pressure value with the statistically greatest probability of presence. In order to ascertain the pressure value within the first pressure profile or within the second pressure profile, that is to say during the plateau phases prior to the injection or after the injection, of the phases with relatively constant pressure in the injection system 100. The first probability density function 410 accordingly has a first maximum, a first pressure level 430 prior to the injection using the injector 140. The second probability density function 420 has a second maximum, a second pressure level 440 after the injection using the injector. The first pressure level 430 and the second pressure level 440 are illustrated in FIG. 3. The pressure difference 450 that arises due to an injection using an injector 140 can be advantageously accurately ascertained from these pressure levels 430, 440. The method is advantageously robust with respect to briefly occurring extreme values (for example, brief high or low pressure values).

Figure 4:
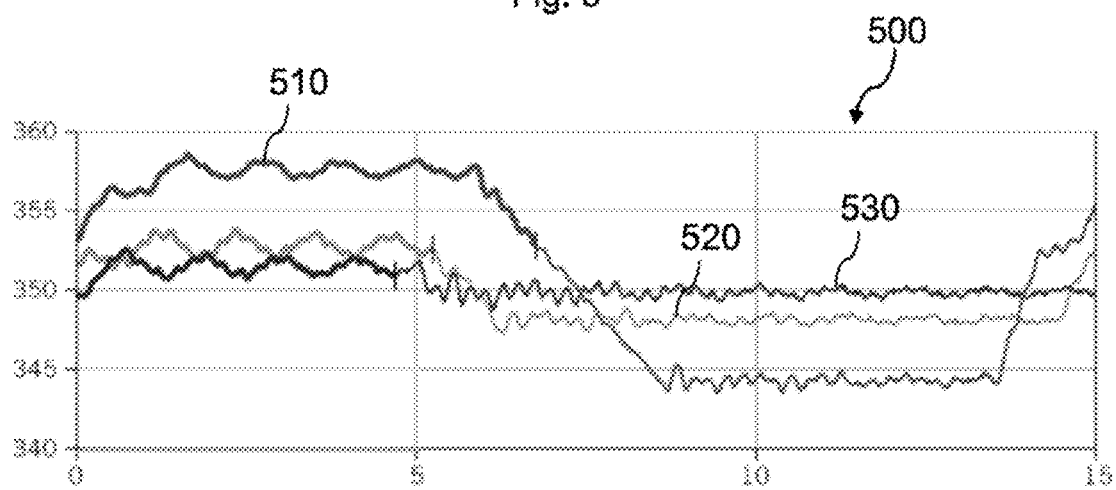
FIG. 4 shows a second pressure profile diagram according to a second example.

FIG. 4 shows a second pressure profile diagram 500. The second pressure profile diagram 500 illustrates a first pressure profile 510, a second pressure profile 520 and a third pressure profile 530 in bar versus the time. The first pressure profile 510 starts at approximately 355 bar and is initially constant until the point in time at which the pressure falls to approximately 345 bar due to an injection using the injector 140, whereupon the first pressure profile is subsequently constant until it increases due to a pumping phase. The second pressure profile 520 initially starts at approximately 352 bar and is subsequently constant, then decreases to approximately 347 bar due to an injection, subsequently remains constant, and subsequently increases again due to a pumping phase. The third pressure profile 530 starts at approximately 351 bar, is subsequently constant, decreases slightly to 350 bar due to a relatively small injection, and is subsequently constant. A subdivision of the pressure profiles into pre-injection and post-injection is illustrated in FIG. 4 on the basis of the line thicknesses. The greater line thickness represents the pressure profiles prior to the respective injection, whereas the smaller line thickness represents the pressure profiles after the respective injection using the injector 140.

Figure 5:
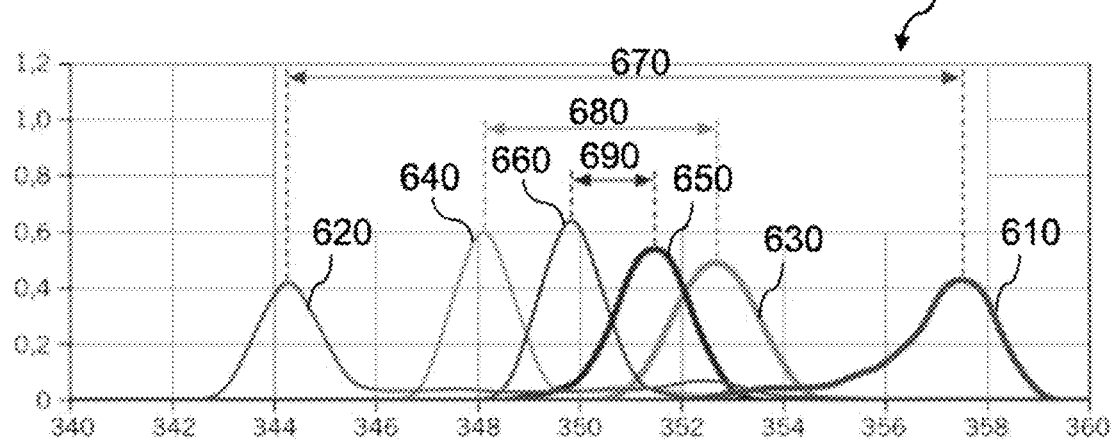
FIG. 5 shows a second kernel density estimation diagram according to the second example.

FIG. 5 shows a kernel density estimation diagram 600, illustrating a first probability density function 610 relating to the first pressure profile 510, a second probability density function 620 relating to the first pressure profile 510, a first probability density function 630 relating to the second pressure profile 520, a second probability density function 640 relating to the second pressure profile 520, a first probability density function 650 relating to the third pressure profile 530, and a second probability density function 660 relating to the third pressure profile 530. Here, the first probability density functions 610, 630, 650 each represent the probability density functions prior to the injection using the injector 140. Here, the second probability density functions 620, 640 and 660 represent the probability density functions after the injection using the injector. FIG. 5 additionally shows a first pressure difference 670, a second pressure difference 680 and a third pressure difference 690. The first pressure difference 670 is the difference between the maximum of the first probability density function 610 of the first pressure profile 510 and the second probability density function 620 of the first pressure profile 510. The second pressure difference 680 is the difference between the maxima of the second probability density function 630 of the second pressure profile 520 and the second probability density function 640 of the second pressure profile 520. The third pressure difference is the difference between the maxima of the first probability density function 650 of the third pressure profile 530 and the second probability density function 660 of the third pressure profile 530. Accordingly, the pressure difference of the individual injections using the injector can be advantageously easily and accurately ascertained on the basis of the ascertained maxima/the peaks.

FIGS. 4 and 5 show that, due to the good robustness of the method, it is sufficient for the measurement signal of the pressure sensor to be segmented merely into a segment prior to the injection and a segment after the injection in order to achieve an advantageously good and accurate ascertainment of the fluid injection quantity.

Figure 6:
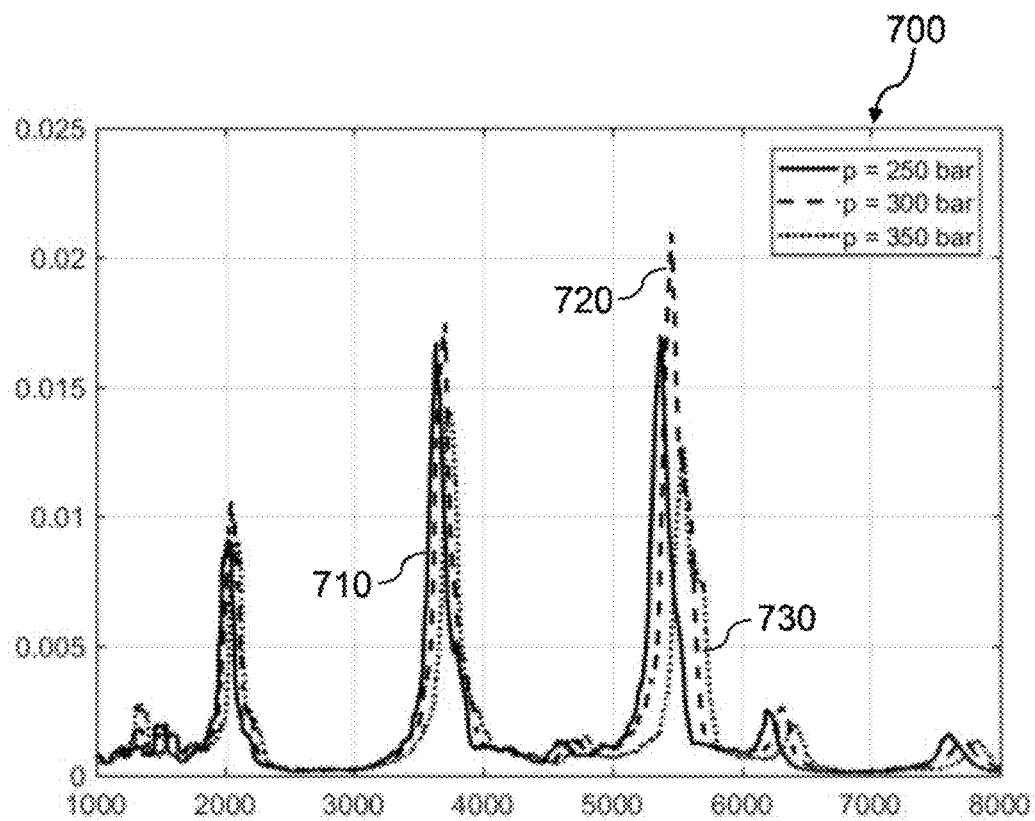
FIG. 6 shows a diagram, according to a first example, in which a fast Fourier transformation of three different pressure profiles has been performed.

FIG. 6 shows a diagram with pressure profiles that have been transformed using a fast Fourier transformation (FFT). The diagram 700 illustrates a first FFT pressure profile 710 at 250 bar, a second FFT pressure profile 720 at 300 bar, and a third FFT pressure profile 730 at 350 bar. The frequency in hertz is plotted on the X axis. The amplitude in the unit [bar] as illustrated on the Y axis. The diagram 700 shows the pressure profiles in the case of a constant temperature. The peaks of the profiles represent different oscillation modes. It can be seen from the diagram how the natural frequency of the individual oscillation modes increases with increasing pressure. The peaks shift to the right with increasing pressure. This is attributable to the fact that the speed of sound of the fluid increases due to an increased pressure. By inference, it is possible from this to ascertain the speed of sound as a function of the pressure. This in turn is used in ascertaining the injection quantity. The accuracy with which the injection quantity is ascertained can thus be additionally further increased.

Figure 7:
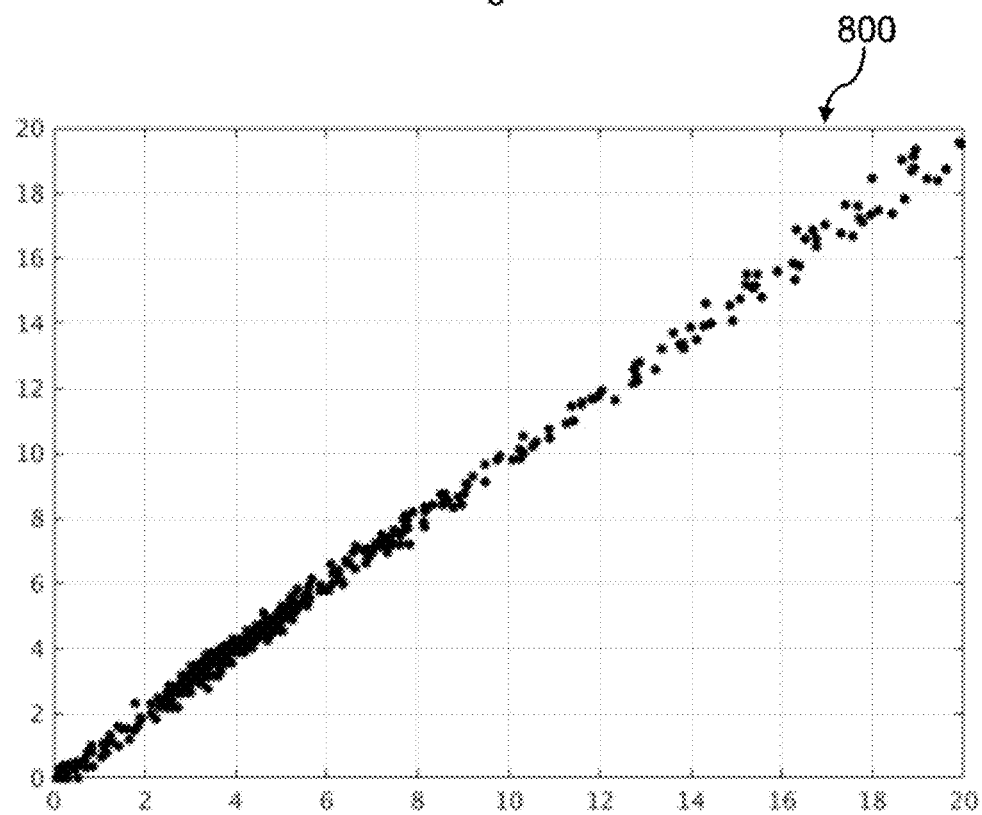
FIG. 7 shows a correlation diagram according to the first example.

FIG. 7 shows a correlation diagram 800. Each point in the correlation diagram 800 corresponds to an individual injection, for which the pressure in the high-pressure region, the temperature and the injection duration have been varied. The injection quantity measured using the Akribis measuring system is shown on the X axis, and the injection quantity ascertained using the method according to the present disclosure is illustrated on the Y axis. Akribis is an injection quantity measuring system that ascertains the injection quantity using a test stand. It involves a piston (one per injector) that is deflected as a result of the injection. The injected mass can be determined very accurately from piston area, deflection and density of the test medium. This type of measurement system is referred to as a quantity indicator. As an alternative to this, there are also pressure indicators (for example Mexus 2.0) or pipe indicators. The system constant was set in a one-off manner for the injection system under test, and thus for the entire data set, in accordance with this correlation diagram. The system constant was ascertained using regression. It can accordingly be seen from the correlation diagram 800 that the ascertainment of the fluid injection quantity in accordance with the present method advantageously accurately corresponds to the actually injected quantities ascertained by series of measurements.

A number of implementations have been described. Nevertheless, it will be understood that various modifications may be made without departing from the spirit and scope of the disclosure. Accordingly, other implementations are within the scope of the following claims.

What is claimed is:

1. A method for ascertaining a fluid injection quantity of an injection system, the injection system having a high-pressure pump, a high-pressure region that adjoins the high-pressure pump, a pressure sensor, and an injector that is fed from the high-pressure region, the method comprising:
   detecting a measurement signal using the pressure sensor during operation of the injection system, the measurement signal characterizing a fluid pressure in the high-pressure region;
   segmenting a first pressure profile from the measurement signal, the first pressure profile characterizes the pressure profile prior to a fluid injection using the injector;
   segmenting a second pressure profile from the measurement signal, the second pressure profile characterizes the pressure profile after the fluid injection using the injector;
   determining a first probability density function prior to the fluid injection and a second probability density function after the fluid injection by performing a kernel density estimation using the first pressure profile and the second pressure profile;
   determining a pressure difference from the first probability density function and the second probability density function;
   determining the fluid injection quantity using the pressure difference; and
   injecting the fluid injection quantity into combustion chambers of an internal combustion engine,
   wherein a triangular kernel and/or a predetermined bandwidth is being used in the kernel density estimation.

2. The method of claim 1, further comprising:
   determining a maximum of the first probability density function and a maximum of the second probability density function; and
   determining the pressure difference using the maximum of the first probability density function and the maximum of the second probability function.

3. The method of claim 1, wherein the fluid injection quantity is based on a system constant, the system constant taking into consideration geometry-dependent variables of the injection system.

4. The method of claim 1, further comprising:
   determining a variable speed of sound from a geometry of the high-pressure region and a natural frequency of a standing wave stimulated by a pump delivery action of the high-pressure pump and fluid injection by the injector, wherein the fluid injection quantity is based on the variable speed of sound.

5. The method of claim 4, further comprising:
   determining the natural frequency from a part of the measurement signal using a fast Fourier transformation.

6. The method of claim 1, wherein the bandwidth is 0.5 bar to 1 bar.

7. A method for ascertaining a fluid injection quantity of an injection system, the injection system having a high-pressure pump, a high-pressure region that adjoins the high-pressure pump, a pressure sensor, and an injector that is fed from the high-pressure region, the injection system includes several injectors, the several injectors are each fed from the high-pressure region, the method includes:
   detecting a measurement signal using the pressure sensor during operation of the injection system, the measurement signal characterizing a fluid pressure in the high-pressure region;
   segmenting a first injector-specific pressure profile from the measurement signal for each of the injectors, the first injector-specific pressure profile characterizes the pressure profile prior to a fluid injection using the injector;
   segmenting a second injector-specific pressure profile from the measurement signal for each of the injectors, the second injector-specific pressure profile characterizes the pressure profile after the fluid injection using the injector;
   determining a first probability density function for each injector prior to the fluid injection and a second probability density function for each injector after the fluid injection by performing a kernel density estimation using the first injector-specific pressure profile and the second injector-specific pressure profile;
   determining a pressure difference for each of the injectors from the first probability density function and the second probability density function;
   determining the fluid injection quantity using the respective pressure difference, for each of the injectors; and
   injecting the fluid injection quantity into combustion chambers of an internal combustion engine.

8. The method of claim 1, further comprising:
   comparing the fluid injection quantity with a predetermined injection quantity; and
   adapting an actuation of the injector if the determined fluid injection quantity deviates from the predetermined injection quantity.

9. A device for ascertaining a fluid injection quantity of an injection system, the injection system having a high-pressure pump, a high-pressure region that adjoins the high-pressure pump, a pressure sensor, and an injector that is fed from the high-pressure region, the device having a control unit that is configured to control a method, the method comprising:

detecting a measurement signal using the pressure sensor during operation of the injection system, the measurement signal characterizing a fluid pressure in the high-pressure region;

segmenting a first pressure profile from the measurement signal, the first pressure profile characterizes the pressure profile prior to a fluid injection using the injector, and segmenting a second pressure profile from the measurement signal, the second pressure profile characterizes the pressure profile after the fluid injection using the injector;

determining a first probability density function prior to the fluid injection and a second probability density function after the fluid injection by performing a kernel density estimation using the first pressure profile and the second pressure profile;

determining a pressure difference from the first probability density function and the second probability density function; determining the fluid injection quantity using the pressure difference; and injecting the fluid injection quantity into combustion chambers of an internal combustion engine, wherein a triangular kernel and/or a predetermined bandwidth is being used in the kernel density estimation.

10. The device of claim 9, wherein the method further comprises:

determining a maximum of the first probability density function and a maximum of the second probability density function; and determining the pressure difference using the maximum of the first probability density function and the maximum of the second probability function.

11. The device of claim 9, wherein the fluid injection quantity is based on a system constant, the system constant taking into consideration geometry-dependent variables of the injection system.

12. The device of claim 9, wherein the method further comprises:

determining a variable speed of sound from a geometry of the high-pressure region and a natural frequency of a standing wave stimulated by a pump delivery action of the high-pressure pump and fluid injection by the injector, wherein the fluid injection quantity is based on the variable speed of sound.

13. The device of claim 12, wherein the method further comprises:

determining the natural frequency from a part of the measurement signal using a fast Fourier transformation.

14. The method of claim 9, wherein the bandwidth is 0.5 bar to 1 bar.

15. A device for ascertaining a fluid injection quantity of an injection system, the injection system having a high-pressure pump, a high-pressure region that adjoins the high-pressure pump, a pressure sensor, and an injector that is fed from the high-pressure region, the injection system includes several injectors, the several injectors are each fed from the high-pressure region, the device has a control unit that is configured to control a method, the method comprising:

detecting a measurement signal using the pressure sensor during operation of the injection system, the measurement signal characterizing a fluid pressure in the high-pressure region;

segmenting a first injector-specific pressure profile from the measurement signal for each of the injectors, the first injector-specific pressure profile characterizes the pressure profile prior to a fluid injection using the injector;

segmenting a second injector-specific pressure profile from the measurement signal for each of the injectors, the second injector-specific pressure profile characterizes the pressure profile prior to a fluid injection using the injector;

determining a first probability density function for each injector prior to the fluid injection and determining a second probability density function for each injector after the fluid injection by performing a kernel density estimation using the first injector-specific pressure profile and the second injector-specific pressure profile;

determining a pressure difference for each of the injectors from the first probability density function and the second probability density function; and determining the fluid injection quantity using the respective pressure difference, for each of the injectors; and injecting the fluid injection quantity into combustion chambers of an internal combustion engine.

16. The device of claim 9, wherein the method further comprises:

comparing the fluid injection quantity with a predetermined injection quantity, and adapting an actuation of the injector if the determined fluid injection quantity deviates from the predetermined injection quantity.

* * * * *